(12) United States Patent
Perikala et al.

(10) Patent No.: US 11,557,209 B2
(45) Date of Patent: Jan. 17, 2023

(54) SYSTEM AND MECHANISM FOR A CONNECTED AIRCRAFT CROWD SOURCED AUGMENTED REALITY PROCESSED CLOUD CEILING INFORMATION

(71) Applicant: Honeywell International Inc., Morris Plains, NJ (US)

(72) Inventors: Kiran Perikala, Guntur (IN); Tulasi Mohan Naraharisetty, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 255 days.

(21) Appl. No.: 16/812,823

(22) Filed: Mar. 9, 2020

(65) Prior Publication Data

US 2021/0280070 A1  Sep. 9, 2021

(51) Int. Cl.
| | |
|---|---|
| *H04L 67/12* | (2022.01) |
| *G08G 5/00* | (2006.01) |
| *H04B 7/185* | (2006.01) |
| *G06F 16/29* | (2019.01) |

(52) U.S. Cl.
CPC .......... *G08G 5/0013* (2013.01); *G06F 16/29* (2019.01); *H04B 7/18506* (2013.01); *H04L 67/12* (2013.01)

(58) Field of Classification Search
CPC ...... G08G 5/0013; G08G 5/0069; G08G 5/04; G08G 5/045; G06F 16/29; H04B 7/18506; H04L 67/12; G05D 1/0088; G05D 1/0011; G05D 1/042; G05D 1/102; G05D 13/00; G05D 1/00; G05D 1/10; G05D 1/101; G05D 1/0653; G05D 1/0202; B64C 39/024; B64C 2201/141; B64C 2201/146; B64D 45/04; B64F 1/20
See application file for complete search history.

(56) References Cited

U.S. PATENT DOCUMENTS

| | | | |
|---|---|---|---|
| 6,085,152 A | 7/2000 | Doerfel | |
| 7,894,044 B1 | 2/2011 | Sullivan | |
| 8,509,965 B2 | 8/2013 | Lin | |
| 2016/0290817 A1* | 10/2016 | Hoogland | ............ G01C 23/005 |
| 2016/0379499 A1 | 12/2016 | Balasubramanian et al. | |
| 2018/0313975 A1* | 11/2018 | Chen | ........................ G01W 1/10 |
| 2019/0172361 A1* | 6/2019 | Schwindt | ............ G08G 5/0021 |

* cited by examiner

*Primary Examiner* — Hai Phan
*Assistant Examiner* — Anthony D Afrifa-Kyei
(74) *Attorney, Agent, or Firm* — Alston & Bird LLP

(57) ABSTRACT

A method, apparatus, and computer program product provide for crowdsourcing data from a plurality of aircraft systems to determine cloud ceiling information. In the context of a method, the method receives a set of sensor data from a first aircraft system captured during a first event. The method determines, based on the set of sensor data, a cloud ceiling value for a location and a time at which the first set of sensor data was captured. The method also stores the cloud ceiling value in association with a landing region and causes transmission of the cloud ceiling value to one or more additional aircraft systems.

18 Claims, 8 Drawing Sheets

SYSTEM AND MECHANISM FOR A CONNECTED AIRCRAFT CROWD SOURCED AUGMENTED REALITY PROCESSED CLOUD CEILING INFORMATION

TECHNOLOGICAL FIELD

An example embodiment relates generally to aircraft flight data, and, more particularly, to techniques for generating cloud ceiling information for real-time access by a plurality of aircraft.

BACKGROUND

In some examples, cloud ceiling information may need to be obtained by an aircraft in order to aid in the determination of whether it is safe to land at a particular location, such as in an instance in which instrument landing systems onboard the aircraft are malfunctioning.

BRIEF SUMMARY

A method, apparatus, and computer program product are disclosed for determining cloud ceiling information and providing the cloud ceiling information to a plurality of aircraft. By crowdsourcing and utilizing data received by aircraft during takeoff and landing procedures to determine cloud ceiling information at a plurality of locations, a more efficient approach to determining and delivering cloud ceiling information is provided compared to conventional methods. Benefits of this design include increased situational awareness, safety, and efficiency for both aircraft and ground control, reduced transmissions between aircraft and ground control, as well as both reduced travel time and fuel expenditure.

In an example embodiment, an apparatus configured to determine and provide crowdsourced cloud ceiling data is provided comprising at least one processor and at least one non-transitory memory including program code, the at least one non-transitory memory and the program code configured to, with the processor, cause the apparatus to at least receive a first set of sensor data from a first aircraft system, wherein the first set of sensor data comprises data captured by one or more sensors at the first aircraft system during a first event within a first landing region. The memory including the program code is further configured to, with the processor, cause the apparatus to determine, based on the first set of sensor data, a cloud ceiling value for a location and a time at which the first set of sensor data was captured. The memory including the program code is further configured to, with the processor, cause the apparatus to store the cloud ceiling value in association with the first landing region based on the location associated with the first set of sensor data. The memory including the program code is further configured to, with the processor, cause the apparatus to, in an instance in which the cloud ceiling value stored in association with the first landing region fails to satisfy a predefined threshold, determine, based at least on the first landing region, one or more alternative landing regions and cause transmission of one or more indications of the one or more determined alternative landing regions, the cloud ceiling value associated with the first landing region and the one or more cloud ceiling values associated with one or more alternative landing regions to a second aircraft system.

In some embodiments, the memory including the program code is further configured to, with the processor, cause the apparatus to receive one or more additional sets of sensor data from one or more additional aircraft systems, wherein the one or more additional sets of sensor data are associated with the first landing region. In some embodiments, the memory including the program code is further configured to, with the processor, cause the apparatus to determine, based on the first set of sensor data and the one or more additional sets of sensor data, an updated cloud ceiling value for the first landing region. In some embodiments, the memory including the program code is further configured to, with the processor, cause the apparatus to cause transmission of the updated cloud ceiling value to one or more additional aircraft systems. In some embodiments, the memory including the program code is further configured to, with the processor, cause the apparatus to aggregate the first set of sensor data and the one or more additional sets of sensor data to determine an average cloud ceiling value for a time period, wherein the updated cloud ceiling value represents the average cloud ceiling value. In some embodiments, the memory including the program code is further configured to, with the processor, cause the apparatus to aggregate the first set of sensor data and the one or more additional sets of sensor data to determine a most recent cloud ceiling value for a time period, wherein the updated cloud ceiling value represents the most recent cloud ceiling value.

In some embodiments of the apparatus, the first event comprises an ascension of the aircraft system within the first landing region or a descension of the first aircraft system within the first landing region. In some embodiments, the memory including the program code is further configured to, with the processor, cause the apparatus to receive a cloud ceiling information request from the second aircraft system, wherein the cloud ceiling information request is associated with the first landing region. In some embodiments, the cloud ceiling value associated with the first landing region and the one or more cloud ceiling values associated with one or more alternative landing regions are caused to be transmitted in response to receiving the cloud ceiling information request. In some embodiments, the determination of the one or more alternative landing regions is further based on one or more cloud ceiling values associated with the one or more alternative landing regions. In some embodiments, the memory including the program code is further configured to, with the processor, cause the apparatus to determine whether the one or more cloud ceiling values stored in association with the one or more alternative landing regions satisfy the predefined threshold. In some embodiments, the transmission of the one or more cloud ceiling values associated with one or more alternative landing regions includes only cloud ceiling values associated with one or more alternative landing regions that satisfy the predefined threshold.

In a further example embodiment, computer-implemented method for determining and providing crowdsourced cloud ceiling data is provided comprising receiving a first set of sensor data from a first aircraft system, wherein the first set of sensor data comprises data captured by one or more sensors at the first aircraft system during a first event within a first landing region. The computer-implemented method further comprises determining, based on the first set of sensor data, a cloud ceiling value for a location and a time at which the first set of sensor data was captured. The computer-implemented method further comprises storing the cloud ceiling value in association with the first landing region based on the location associated with the first set of sensor data. The computer-implemented method further comprises, in an instance in which the cloud ceiling value stored in association with the first landing region fails to satisfy a predefined threshold, determining, based at least on the first landing region, one or more alternative landing regions and causing transmission of one or more indications of the one or more determined alternative landing regions, the cloud ceiling value associated with the first landing region and the one or more cloud ceiling values associated with one or more alternative landing regions to a second aircraft system.

In some embodiments, the computer-implemented method further comprises receiving one or more additional sets of sensor data from one or more additional aircraft systems, wherein the one or more additional sets of sensor data are associated with the first landing region. In some embodiments, the computer-implemented method further comprises determining, based on the first set of sensor data and the one or more additional sets of sensor data, an updated cloud ceiling value for the first landing region. In some embodiments, the computer-implemented method further comprises causing transmission of the updated cloud ceiling value to one or more additional aircraft systems. In some embodiments, the computer-implemented method further comprises aggregating the first set of sensor data and the one or more additional sets of sensor data to determine an average cloud ceiling value for a time period, wherein the updated cloud ceiling value represents the average cloud ceiling value. In some embodiments, the computer-implemented method further comprises aggregating the first set of sensor data and the one or more additional sets of sensor data to determine a most recent cloud ceiling value for a time period, wherein the updated cloud ceiling value represents the most recent cloud ceiling value.

In some embodiments of the computer-implemented method, the first event comprises an ascension of the aircraft system within the first landing region or a descension of the first aircraft system within the first landing region. In some embodiments, the computer-implemented method further comprises receiving a cloud ceiling information request from the second aircraft system, wherein the cloud ceiling information request is associated with the first landing region. In some embodiments, the cloud ceiling value associated with the first landing region and the one or more cloud ceiling values associated with one or more alternative landing regions are caused to be transmitted in response to receiving the cloud ceiling information request. In some embodiments, the determination of the one or more alternative landing regions is further based on one or more cloud ceiling values associated with the one or more alternative landing regions. In some embodiments, the computer-implemented method further comprises determining whether the one or more cloud ceiling values stored in association with the one or more alternative landing regions satisfy the predefined threshold. In some embodiments, the transmission of the one or more cloud ceiling values associated with one or more alternative landing regions includes only cloud ceiling values associated with one or more alternative landing regions that satisfy the predefined threshold.

In a further example embodiment, computer program product is provided comprising at least one non-transitory computer-readable storage medium having computer-readable program code portions stored therein, the computer-readable program code portions comprising an executable portion configured to receive a first set of sensor data from a first aircraft system, wherein the first set of sensor data comprises data captured by one or more sensors at the first aircraft system during a first event within a first landing region. The computer-readable program code portions comprising an executable portion are further configured to determine, based on the first set of sensor data, a cloud ceiling value for a location and a time at which the first set of sensor data was captured. The computer-readable program code portions comprising an executable portion are further configured to store the cloud ceiling value in association with the first landing region based on the location associated with the first set of sensor data. The computer-readable program code portions comprising an executable portion are further configured to, in an instance in which the cloud ceiling value stored in association with the first landing region fails to satisfy a predefined threshold, determine, based at least on the first landing region, one or more alternative landing regions and cause transmission of one or more indications of the one or more determined alternative landing regions, the cloud ceiling value associated with the first landing region and the one or more cloud ceiling values associated with one or more alternative landing regions to a second aircraft system.

In some embodiments, the computer-readable program code portions comprising an executable portion are further configured to receive one or more additional sets of sensor data from one or more additional aircraft systems, wherein the one or more additional sets of sensor data are associated with the first landing region. In some embodiments, the computer-readable program code portions comprising an executable portion are further configured to determine, based on the first set of sensor data and the one or more additional sets of sensor data, an updated cloud ceiling value for the first landing region. In some embodiments, the computer-readable program code portions comprising an executable portion are further configured to cause transmission of the updated cloud ceiling value to one or more additional aircraft systems. In some embodiments, the computer-readable program code portions comprising an executable portion are further configured to aggregate the first set of sensor data and the one or more additional sets of sensor data to determine an average cloud ceiling value for a time period, wherein the updated cloud ceiling value represents the average cloud ceiling value. In some embodiments, the computer-readable program code portions comprising an executable portion are further configured to aggregate the first set of sensor data and the one or more additional sets of sensor data to determine a most recent cloud ceiling value for a time period, wherein the updated cloud ceiling value represents the most recent cloud ceiling value.

In some embodiments of the computer program product, the first event comprises an ascension of the aircraft system within the first landing region or a descension of the first aircraft system within the first landing region. In some embodiments, the computer-readable program code portions comprising an executable portion are further configured to receive a cloud ceiling information request from the second aircraft system, wherein the cloud ceiling information request is associated with the first landing region. In some embodiments, the cloud ceiling value associated with the first landing region and the one or more cloud ceiling values associated with one or more alternative landing regions are caused to be transmitted in response to receiving the cloud ceiling information request. In some embodiments, the determination of the one or more alternative landing regions is further based on one or more cloud ceiling values associated with the one or more alternative landing regions. In some embodiments, the computer-readable program code portions comprising an executable portion are further configured to determine whether the one or more cloud ceiling values stored in association with the one or more alternative landing regions satisfy the predefined threshold. In some embodiments, the transmission of the one or more cloud ceiling values associated with one or more alternative landing regions includes only cloud ceiling values associated with one or more alternative landing regions that satisfy the predefined threshold.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
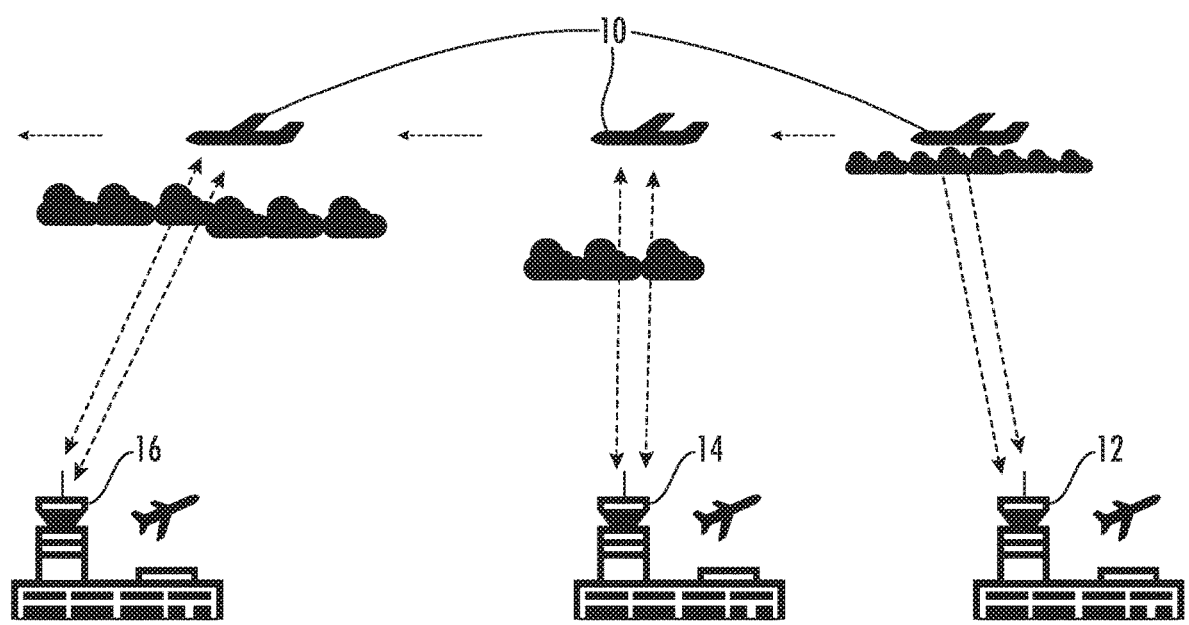

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings.

Figure 2:
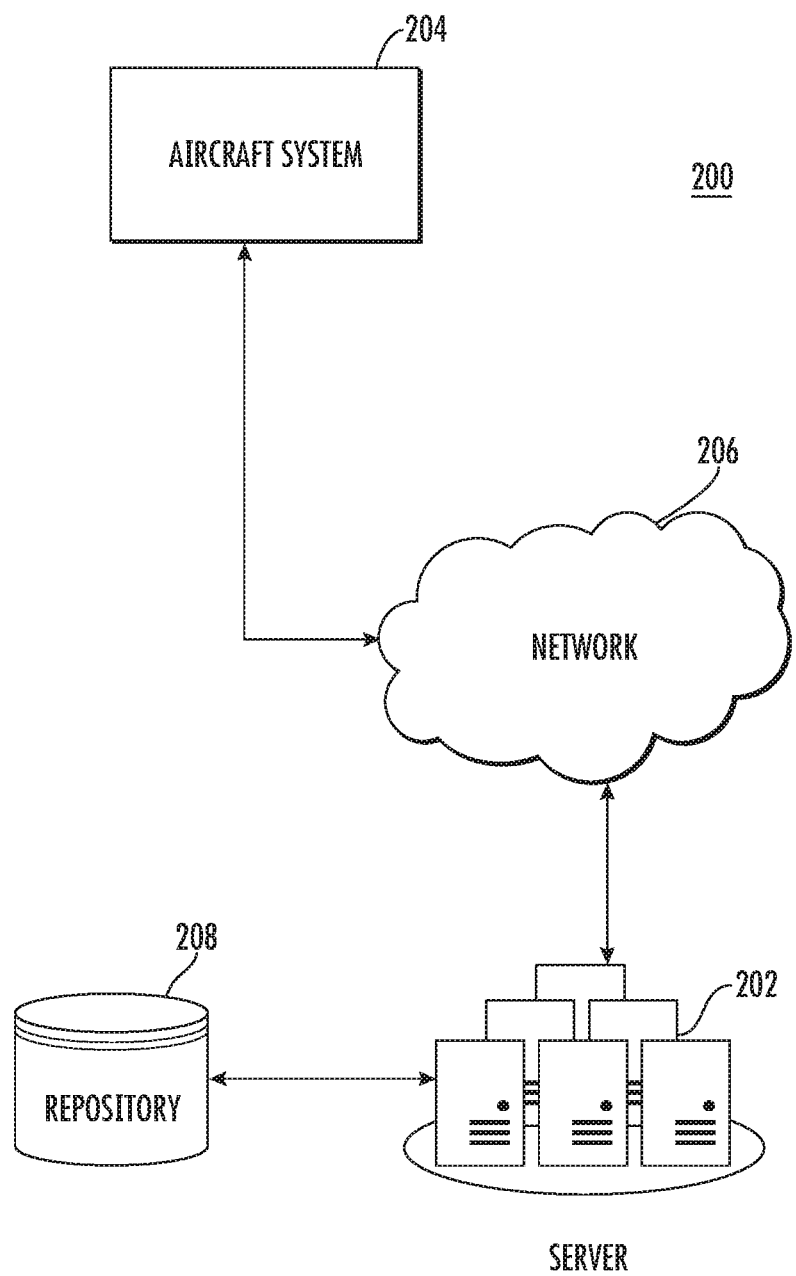
Figure 3:
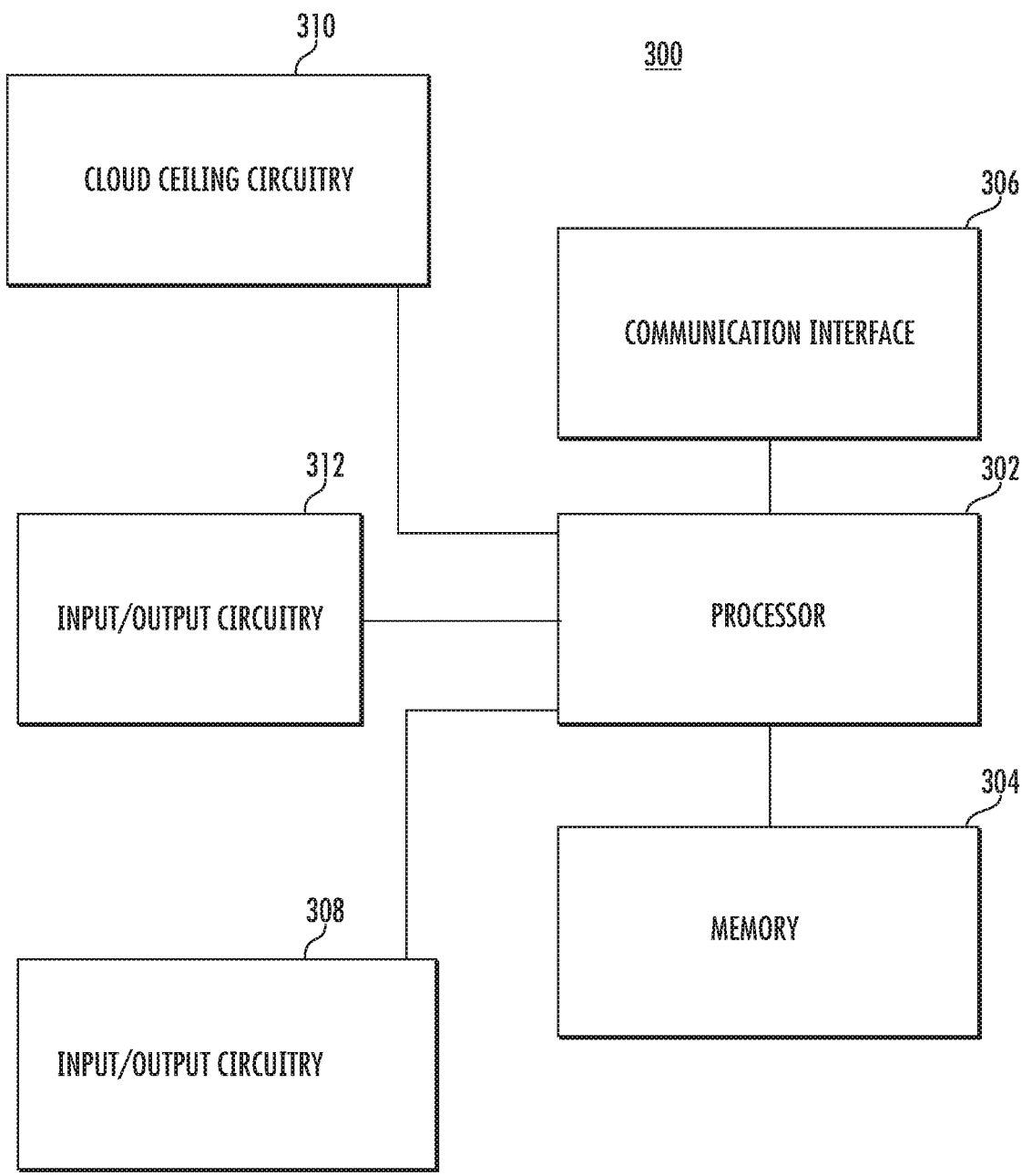
Figure 4:
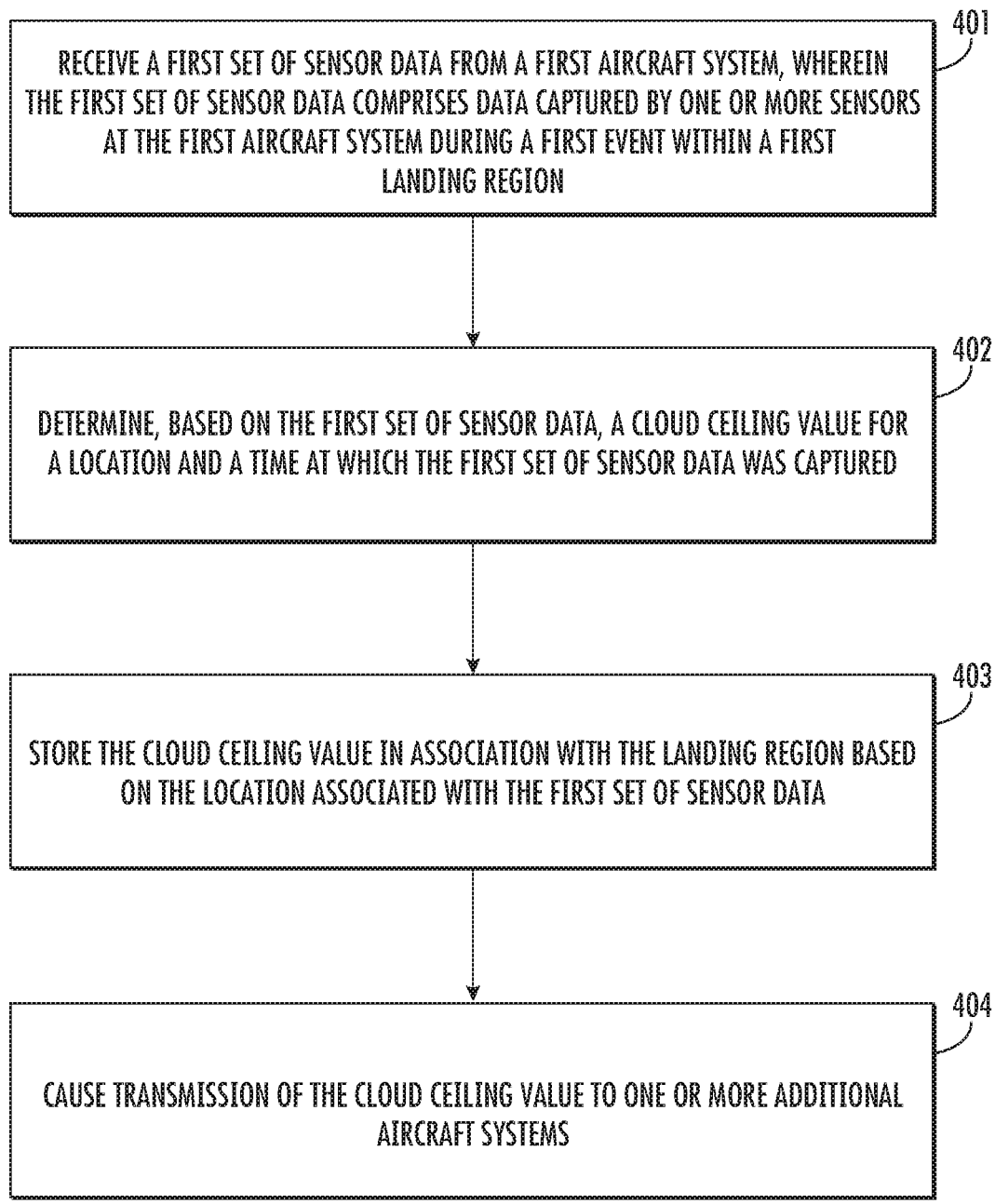
Figure 5:
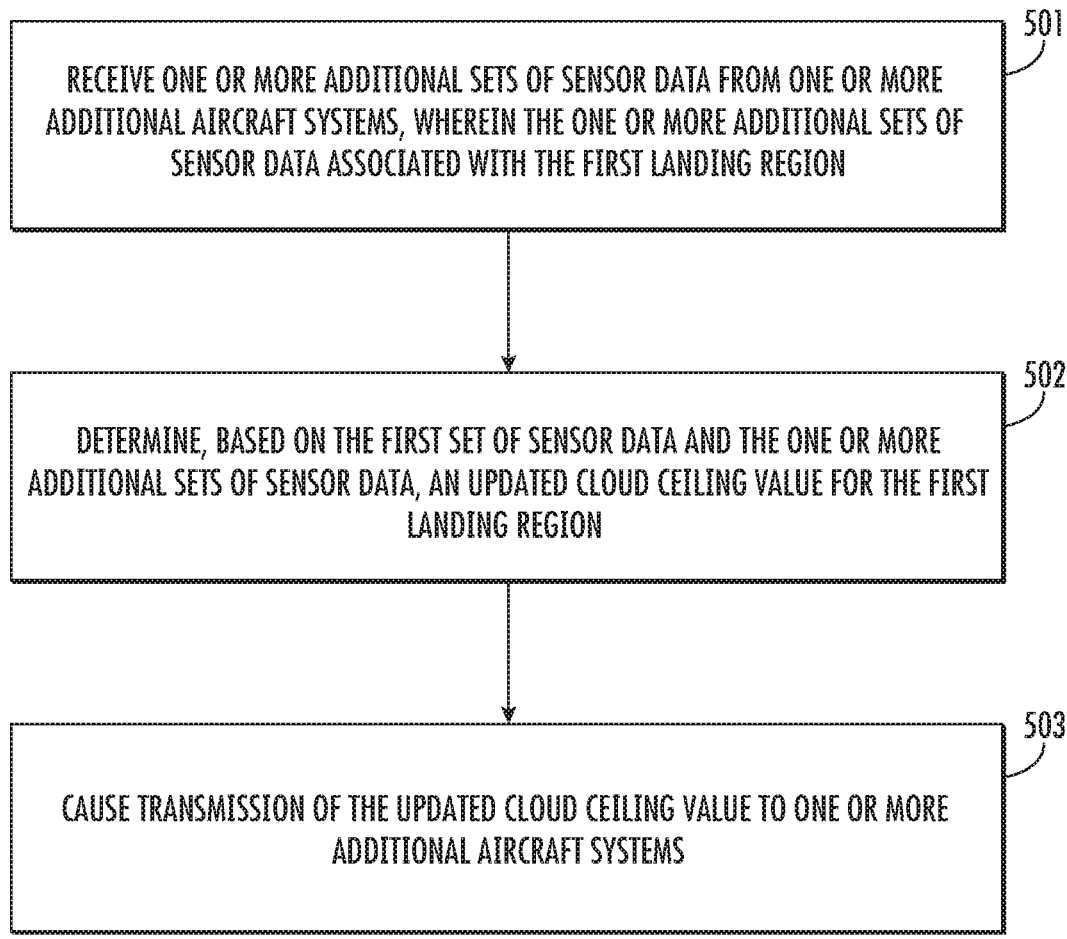
Figure 6:
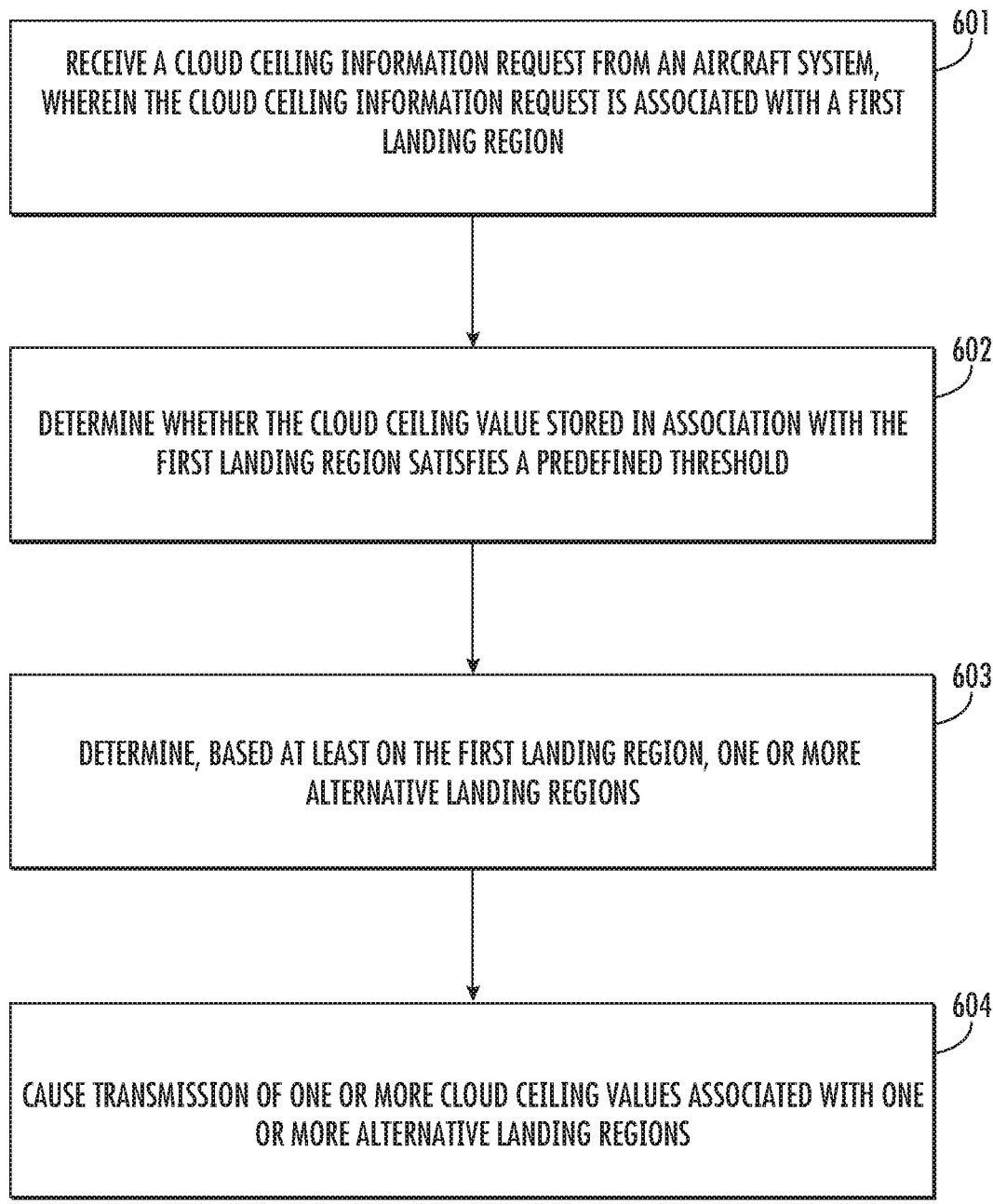
Figure 7A:
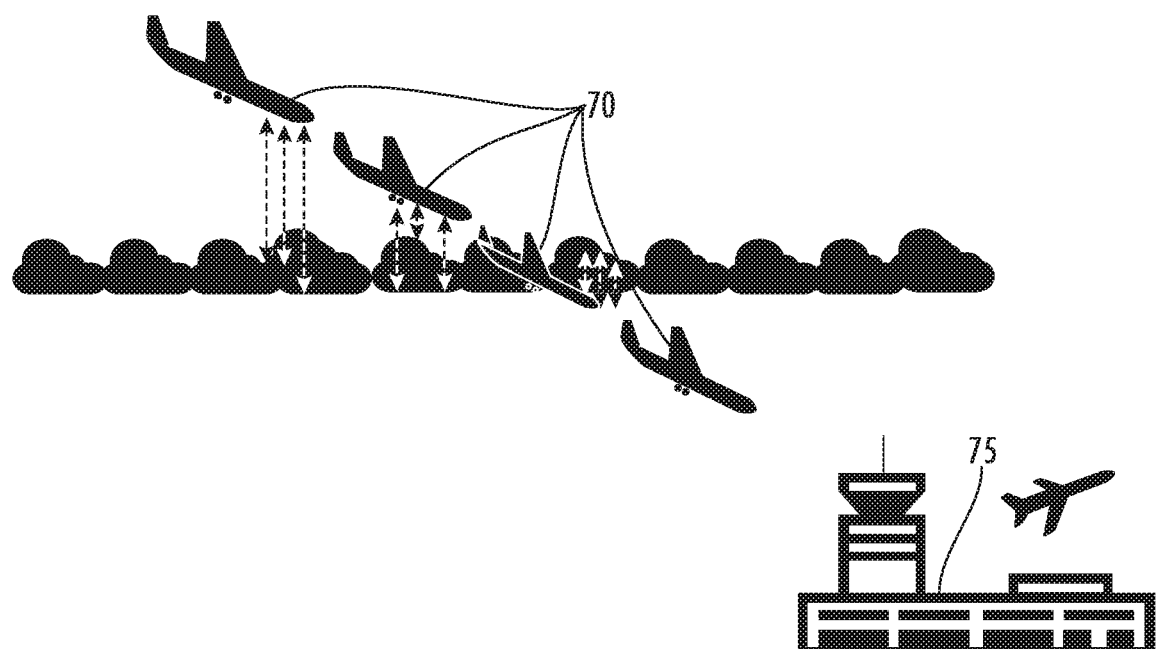
Figure 7B:
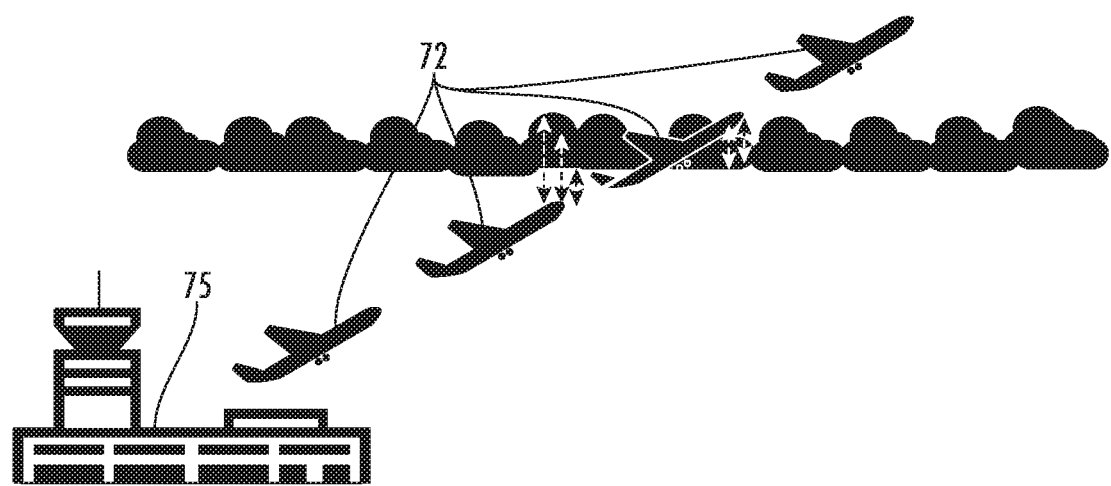

FIG. 1 is a representation of an aircraft flight in accordance with an example embodiment of the present disclosure;

FIG. 2 is a block diagram of a system configured to communicate via a network in accordance with an example embodiment;

FIG. 3 is a block diagram of an apparatus that may be specifically configured in accordance with an example embodiment of the present disclosure;

FIGS. 4-6 are flowcharts illustrating operations performed in accordance with an example embodiment;

FIG. 7A is a representation of an aircraft descension in accordance with an example embodiment of the present disclosure; and FIG. 7B is a representation of an aircraft ascension in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," "electronic information," "signal," "command," and similar terms may be used interchangeably to refer to data capable of being captured, transmitted, received, and/or stored in accordance with various embodiments of the present disclosure. Thus, use of any such terms should not be taken to limit the spirit and scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, repeaters, and/or the like, sometimes referred to herein as a "network." Similarly, where a first computing device is described herein as sending data to a second computing device, it will be appreciated that the data may be sent or transmitted directly to the second computing device or may be sent or transmitted indirectly via one or more intermediary computing devices, such as, for example, one or more servers, remote servers, cloud-based servers (e.g., cloud utilities), relays, routers, network access points, base stations, hosts, repeaters, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including" and variants thereof are used in either the detailed description or the claims, these terms are intended to be inclusive in a manner similar to the term "comprising."

The phrases "in one embodiment," "according to one embodiment," "in some embodiments," and the like generally refer to the fact that the particular feature, structure, or characteristic following the phrase may be included in the at least one embodiment of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

As used herein, the term "aircraft system" refers to computer hardware or a combination of computer hardware and software that is configured (either physically or by the execution of software) to collect and/or generate sensor data of the present disclosure and, among various other functions, is configured to directly, or indirectly, transmit and receive data. An example aircraft system can refer to a computing device/system of an aircraft that may be, in whole or in part, supported by the aircraft during flight and configured to facilitate operation thereof. Said differently, the aircraft system can refer to the collection of sensors, processors, memories, dials, gauges, displays, and the like configured to control or facilitate operation of one or more processes of an aircraft. Furthermore, the aircraft system server may be housed, in some embodiments, entirely by the aircraft, while in other embodiments, the aircraft system may include some or all elements located separate from the aircraft. An example aircraft system can refer to a computing device/system configured for collecting and/or generating sensor data for an aircraft and/or receiving data, such as cloud ceiling information and/or the like. In some embodiments, the aircraft system may be configured to communicate with the other computing devices via Bluetooth, NFC, Wi-Fi, 3G, 4G, 5G, RFID protocols, and the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Overview

In some examples, cloud ceiling refers to a measurement of the height of the base of the lowest clouds that cover more than half of the sky (e.g., more than four oktas) relative to the ground. Cloud ceiling measurements at arrival and departure locations for aircraft (e.g., airports, hangars, runways, vessels, helipads, and/or the like) impact aircraft operations around the world. For example, cloud ceilings can impact operations associated with both visual flight rules (VFR) and instrument flight rules (IFR), and considerations regarding minimum cloud ceiling may also depend on the type of flight, a predefined standard operating procedure, a pilot's level of experience, and/or operator comfort level.

VFR refers to a set of rules and regulations under which a pilot can operate an aircraft when weather conditions are generally clear enough to allow the pilot to visually see where the aircraft is going. In particular, the weather must be better than basic VFR weather minima, such as visual meteorological conditions (VMC) specified in the rules of a relevant aviation authority, in order to operate the aircraft under VFR. In this regard, VFR requires a pilot to be able to see outside of the cockpit in order to control the aircraft's altitude, navigate, and avoid obstacles such as terrain and/or other aircraft. Governing agencies may establish specific requirements for VFR flight, including minimum visibility and cloud ceiling to ensure that an aircraft operating under VFR is visible from enough distance to ensure safety. In other words, and in some examples, for a pilot to continue flight under VFR, the conditions must be equal to or greater than those specified by the governing body.

An Instrument Landing System (ILS) refers to a radio navigation system or the like which can provide an aircraft with horizontal and vertical guidance prior to and during landing and, at certain fixed points, can indicate a distance to a reference point for landing. An ILS can include equipment stationed on the ground (e.g., at an airport and/or runway) and equipment stationed onboard the aircraft. An ILS can be used by a pilot of an aircraft, for example, during a time in which visibility outside the aircraft is low (e.g., during IFR), such as during inclement weather, and thus operating the aircraft under VFR is not permitted. For example, an ILS may provide precision lateral and vertical guidance to an aircraft approaching and landing (e.g., on a runway) using a combination of radio signals and high-intensity lighting arrays to enable a safe landing. Additionally, an ILS can assist an aircraft during an approach by performing operations such as modulation depth comparisons and may allow for the aircraft to route signals from the ILS into an autopilot system to fly the approach automatically. In some examples, the ILS may comprise two independent subsystems: a localizer which may include an antenna array positioned at the runway to provide lateral guidance, and a guide slope to provide vertical guidance. As one example, the pilot can control the aircraft in a manner such that a glide slope indicator remains centered on a display to ensure the aircraft is following the glide path sufficiently above ground level to remain above obstructions and reach the runway at a safe touchdown point.

In some examples, an ILS can experience a failure, partial malfunctioning, and/or other interruption during a flight and/or an instance in which an aircraft is attempting to approach and perform a landing operation. For example, ILS equipment stationed at a destination airport can experience a failure, causing ILS equipment stationed onboard an approaching aircraft to be unable to communicate with the ILS equipment stationed at the destination airport, rendering the entire ILS system unusable. In a similar scenario, while ILS equipment stationed at the destination airport is operating normally, ILS equipment stationed onboard an aircraft experiences a failure, and the aircraft may unable to utilize ILS to assist with landing and/or other operations.

Under circumstances in which an ILS has at least partially malfunctioned and is unusable by the aircraft, the pilot is unable to perform landing operations via ILS and instead may need to rely on a visual approach. As described above, the visual approach may be regulated by VFR, which may require, as one example, generally clear weather with flight visibility of at least three miles and the aircraft to be kept out of clouds at all times. In this scenario, the pilot of the aircraft needs to know the cloud ceiling at the intended destination airport. If the cloud ceiling at the intended destination airport is too low, a visual landing may not be permitted, and the pilot may need to reroute and/or make other arrangements to land at an alternative airport or other landing region.

With reference to FIG. 1, an example scenario is illustrated in which an aircraft utilizes conventional methods of determining cloud ceiling information. Aircraft 10, for example, is an international flight having departed from New Delhi, India and en route to New York to land at John F. Kennedy (JFK) International Airport. During an approach to JFK, the ILS equipment onboard aircraft 10, in this example, experiences a system failure, leaving a visual approach to landing with VFR as the pilot's only option for landing. However, the pilot needs to ensure or otherwise confirm that conditions at JFK are appropriate for visual landing and attempts to contact the ATC center 12 at JFK.

In some examples, cloud ceiling information can be derived and determined using a plurality of resources including weather forecasts (e.g., provided by the National Weather Service or similar agency), satellite imagery, pilot reports (PIREPs), Meteorological Aerodrome Reports (METAR), and/or local observations. As weather forecasts may differ substantially from actual weather conditions, the pilot may be required to contact an Air Traffic Control (ATC) center for the particular destination airport in order to inquire about actual cloud ceiling conditions at the destination airport. In these situations, the ATC center 12 may consult various resources such as METAR, PIREPs, and/or other resources as described above in order to determine the cloud ceiling information and/or whether the conditions are suitable for the pilot to conduct a VFR approach. In this regard, it can take the ATC center 12 substantial time to determine cloud ceiling information at JFK International Airport and relay the information back to the pilot, as up-to-date cloud ceiling information may not be readily available.

In the event that the cloud ceiling information provided by the ATC center 12 at the destination airport indicates that the cloud ceiling is too low for the aircraft to land safely using VFR (e.g., below a predetermined threshold set by the governing body), the pilot then has to separately contact one or more additional ATC centers 14, 16 at one or more alternative (e.g., nearby) airports and/or other type of landing centers and repeat the process of requesting cloud ceiling information for the one or more alternative airports. The one or more additional ATC centers 14, 16 then need to consult resources as described above in order to determine the cloud ceiling information and/or whether the conditions are suitable for the pilot to conduct a VFR approach at the respective alternative airport.

Thus, the pilot needs to contact multiple ATC centers multiple times and is forced to wait for responses from the ATC centers, resulting in additional unwanted travel time and fuel consumption. Additionally, relying on back-and-forth contact adds to chances of miscommunication between the pilot and one or more ATC centers (e.g., via a language barrier, voice transmission errors, static, noise, and/or the like) which puts the safety of the aircraft in jeopardy. Further, these issues are compounded in the event the destination airport is a heavily-trafficked airport wherein the associated ATC center is handling numerous requests from a multitude of other aircraft and/or if the aircraft is low on fuel.

Applicant has identified a number of deficiencies and problems associated with conventional methods and systems for identifying cloud ceiling information for a location such as an airport. For example, as described above, a pilot of an aircraft is required to separately communicate with numerous ATC centers and subsequently, the ATC centers have to consult numerous resources in order to determine cloud ceiling information to relay back to the pilot, further increasing the time taken to determine an appropriate airport for landing, and, consequently, imposing additional unwanted travel time on passengers and expending precious resources of the aircraft, such as fuel.

Thus, example systems are disclosed herein which provide an aircraft with accurate, up-to-date cloud ceiling information of the destination airport and any available alternate airports in or near real-time and improve upon conventional, inefficient methods of determining cloud ceiling information. In this regard, when faced with critical situations in which a pilot needs to perform a visual approach (e.g., during an ILS failure), the aircraft is provided with real-time cloud ceiling information of destination airport and the real-time cloud ceiling information of one or more alternate airports in order to select the best suitable airport to perform the visual approach and safely land the aircraft. Example benefits of this approach include minimizing travel time, fuel expenditure, and excess transmissions to ATC centers thereby decreasing load on the network (e.g., network 206). Such a system may, in some examples, utilize a plurality of information from a connected environment, such as information about nearby aircraft and traffic conditions, and also aid pilots with real-time situation awareness of one or more landing regions (e.g., airports) and present the pilot with relevant suggestions to perform a visual approach.

System Architecture and Example Apparatus

Referring now to FIG. 2, a block diagram of a system 200 for providing a plurality of aircraft with real-time, accurate, up-to-date cloud ceiling information is illustrated according to an example embodiment. It will be appreciated that the system 200 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 2 illustrates one example of a configuration of such a system, numerous other configurations may also be employed. System 200 is illustrated with an apparatus (e.g., a server 202) communicably connected via a network 206 to one or more aircraft systems 204. The example system may also include a repository 208 that may be hosted by the server 202 or otherwise hosted by devices in communication with the server 202.

The aircraft system 204 may include circuitry, networked processors, and/or the like configured to perform some or all of the apparatus-based (e.g., aircraft system-based) processes described herein, and may be any suitable network server and/or other type of processing device. In this regard, the aircraft system 204 may be embodied by any of a variety of devices. For example, the aircraft system 204 may be configured to receive/transmit data (e.g., sensor data, cloud ceiling data, and/or the like) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 3 and described in connection therewith. In some embodiments, the aircraft system 204 may be located remotely from the server 202 and/or the repository 208, although in other embodiments, the aircraft system 204 may comprise the server 202 and/or the repository 208. The aircraft system 204 may, in some embodiments, comprise several servers, computing devices, sensors and/or the like performing interconnected and/or distributed functions. Despite the many arrangements contemplated herein, the aircraft system 204 is shown and described herein as a single computing device stationed onboard an aircraft to avoid unnecessarily overcomplicating the disclosure.

According to various embodiments, the server 202 may be configured to connect directly with one or more aircraft systems 204 and/or repositories 208 via, for example, an air interface without routing communications via one or more elements of the network 206. Alternatively, or additionally, the server 202 may be configured to communicate with one or more aircraft systems 204 and/or repositories 208 over the network 206. In this regard, the server 202 may receive data, such as sensor data or the like, from one or more aircraft systems 204 and communicate (e.g., cause transmission of) data such as cloud ceiling data and/or the like to one or more aircraft systems 204 via the network 206.

The network 206 may comprise one or more wireline networks, one or more wireless networks, or some combination thereof. The network 206 may comprise, in certain embodiments, one or more servers 202, aircraft systems 204, and/or one or more repositories 208. According to example embodiments, the network 206 may comprise the Internet, an intranet, and/or the like. The network 206 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 206 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 206 may include a public network, such as the Internet, a private network, such as an intranet, or combinations thereof, and may utilize a variety of networking protocols now available or later developed including, but not limited to TCP/IP based networking protocols.

The repository 208 may be stored by any suitable storage device configured to store some or all of the information described herein (e.g., memory 304 of the server 202 or a separate memory system separate from the server 202, such as one or more database systems, backend data servers, network databases, cloud storage devices, or the like provided by another device (e.g., online application or third-party provider) or the like). The repository 208 may comprise data, such as one or more cloud ceiling values or the like received from the server 202 (e.g., via a memory 304 and/or processor(s) 302), flight resource data, landing region data, and/or the like, and the corresponding storage device may thus store this data.

The server 202 may comprise computer hardware and/or software that is configured to receive, store, process, and deliver data to one or more aircraft systems 204 and/or repositories 208. The server 202 may include circuitry, networked processors, or the like configured to perform some or all of the apparatus-based (e.g., server-based) processes described herein, and may be any suitable network server and/or other type of processing device. In this regard, the server 202 may be embodied by any of a variety of devices. For example, the server 202 may be configured to receive and/or transmit data (e.g., sensor data, cloud ceiling data, and/or the like) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 3 and described in connection therewith. In some embodiments, the server 202 may be configured to receive sensor data from one or more aircraft systems 204 and determine, store, and cause transmission of cloud ceiling data.

One example of an apparatus 300 configured to function as the server 202 and/or aircraft system 204 is depicted in FIG. 3. As shown in FIG. 3, the apparatus 300 includes, is associated with or is in communication with a processor 302, a memory 304, and a communication interface 306. Moreover, the apparatus 300 may include cloud ceiling circuitry 310 and, in some embodiments, such as embodiments in which the apparatus 300 is embodied by aircraft system 204, sensor circuitry 308 and/or input/output circuitry 312.

The processor 302 may be in communication with the memory 304 via a bus for passing information among components of the apparatus. The memory 304 may be non-transitory and may include, for example, one or more volatile and/or non-volatile memories. In other words, for example, the memory 304 may be an electronic storage device (e.g., a computer readable storage medium) comprising gates configured to store data (e.g., bits) that may be retrievable by a machine (e.g., a computing device like the processor). The memory 304 may be configured to store information, data, content, applications, instructions, or the like for enabling the apparatus to carry out various functions in accordance with an example embodiment of the present disclosure. For example, the memory 304 could be configured to store sensor data received from one or more aircraft systems 204 for processing by the processor 302. Additionally, or alternatively, the memory 304 could be configured to store instructions for execution by the processor 302, such as instructions associated with determining a cloud ceiling value, determining one or more alternative landing regions, and/or the like.

The apparatus 300 may, in some embodiments, be embodied in various computing devices (e.g., server 202 and/or aircraft system 204) as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 302 may be embodied in a number of different ways. For example, the processor 302 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally, or alternatively, the processor 302 may include one or more processors configured in tandem via the bus to enable independent execution of instructions, pipelining and/or multithreading.

In an example embodiment, the processor 302 may be configured to execute instructions stored in the memory 304 or otherwise accessible to the processor. Alternatively, or additionally, the processor 302 may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor 302 is embodied as an executor of instructions, the instructions may specifically configure the processor to perform the algorithms and/or operations described herein when the instructions are executed. However, in some cases, the processor 302 may be a processor of a specific device (e.g., server 202) configured to employ an embodiment of the present invention by further configuration of the processor 302 by instructions for performing the algorithms and/or operations described herein. The processor 302 may include, among other things, a clock, an arithmetic logic unit (ALU) and logic gates configured to support operation of the processor 302.

The communication interface 306 may be any means such as a device or circuitry embodied in either hardware or a combination of hardware and software that is configured to receive and/or transmit data, including data in the form of sensor data and/or cloud ceiling data or the like. In an example embodiment, the communication interface 306 may be configured to receive one or more sets of sensor data from an aircraft system 204. In this regard, the communication interface 306 may include, for example, a network interface for enabling communications with a wired or wireless communication network. For example, the communication interface 306 may include one or more network interface cards, antennas, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the server 202 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In an embodiment in which the apparatus 300 is embodied by a server 202, the apparatus 300 may comprise additional circuitry for carrying out operations associated with determining and causing transmission of cloud ceiling data. For example, the apparatus 300 may comprise cloud ceiling circuitry 310. The cloud ceiling circuitry 310 may comprise one or more instructions or predefined functions for directing the processor 302 to carry out operations associated with the cloud ceiling circuitry 310. In an embodiment, the cloud ceiling circuitry 310 may comprise one or more predefined functions and/or commands for determining a cloud ceiling value based on a set of received sensor data, one or more predefined functions and/or commands for determining one or more alternative landing regions, one or more predefined functions and/or commands for causing transmission of one or more cloud ceiling values to one or more additional aircraft systems, one or more predefined functions and/or commands for aggregating a plurality of sensor data to determine a cloud ceiling value, and/or the like.

In some embodiments, such as embodiments in which the apparatus 300 is embodied by an aircraft system 204, the apparatus 300 may further include input/output circuitry 312 that may be in communication with processor 302 to provide output to a user and to receive input from a user, user device, or another source (e.g., display a determined cloud ceiling value to an aircraft pilot). In this regard, the input/output circuitry 312 may, in some embodiments, comprise display circuitry that may be manipulated by a mobile application and/or user. In some embodiments, the input/output circuitry 312 may also include additional functionality such as a keyboard, a mouse, a joystick, a touch screen, touch areas, soft keys, hard keys, a microphone, a speaker, or other input/output mechanisms. The processor 302 and/or user interface circuitry comprising the processor 302 may be configured to control one or more functions of a display through computer program instructions (e.g., software and/or firmware) stored on a memory accessible to the processor (e.g., memory 304, and/or the like).

In some embodiments in which the apparatus 300 is embodied by aircraft system 204, the apparatus 300 may comprise additional circuitry for carrying out operations associated with collecting, generating, and causing transmission of sensor data. For example, the apparatus 300 may comprise sensor circuitry 308. The sensor circuitry 308 may comprise one or more sensors such as, for example, one or more high-resolution cameras, one or more near-infrared cameras, one or more millimeter wave radar sensors, and/or the like, and include one or more instructions or predefined functions for directing the processor 302 to carry out operations associated with the sensor circuitry 308. In an embodiment, the sensor circuitry 308 may comprise one or more predefined functions and/or commands for collecting and/or generating sensor data (e.g., from one or more sensors), causing transmission of sensor data, and/or the like.

Example Operations for Determination of Cloud Ceiling Information

FIG. 4 illustrates operations that may be performed by the apparatus 300 (e.g., when embodied by server 202) for determining cloud ceiling information and providing the cloud ceiling information to a plurality of aircraft. At operation 401, the apparatus 300, such as the processor 302, the communication interface 306 or the like, is configured to receive a first set of sensor data from a first aircraft system, wherein the first set of sensor data comprises data captured by one or more sensors at the first aircraft system during a first event within a first landing region.

As described above, in some embodiments, the aircraft system can be stationed onboard an aircraft (e.g., a passenger plane, helicopter, jet, and/or the like) and comprise one or more sensors configured to collect various data to assist the aircraft during flight and/or other operations. For example, an aircraft system can comprise sensors including, but not limited to, one or more high-resolution cameras, one or more millimeter wave radar sensors, and/or one or more near-infrared cameras. In some embodiments, these sensors are conventionally used to assist the aircraft with operations such as providing vision in limited visibility, enhanced flight vision rendering on cockpit display systems, and/or current flight mission-specific operations such as use in synthetic vision systems, enhanced vision systems, and/or the like. As such, sensor data collected by the one or more sensors for these purposes are not conventionally transmitted elsewhere other than the aircraft. In this regard, the present disclosure advantageously utilizes sensor data in order to determine cloud ceiling information as further described herein.

In some embodiments, the sensor data can be captured by the one or more sensors at the aircraft system 204 during an event, such as during a takeoff or landing operation of the aircraft. In this regard, the sensor data can be captured by the one or more sensors at the aircraft system during ascension of the aircraft system within a landing region (e.g., an airport, runway, helipad, hangar, vessel, and/or the like) or a descension of the aircraft system within a landing region. FIGS. 7A and 7B illustrate an example descension and ascension of an aircraft, respectively. As shown in FIG. 7A, aircraft 70 is descending (e.g., performing a landing procedure) at airport 75. During descension, the aircraft system onboard aircraft 70 is collecting sensor data using one or more sensors in order to capture data related to conditions exterior to the aircraft (e.g., cloud cover, cloud location, and/or the like). Similarly, in FIG. 7B, aircraft 72 is ascending (e.g., performing a takeoff procedure) at airport 75 and the aircraft system onboard aircraft 72 is collecting sensor data using one or more sensors in order to capture data related to conditions exterior to the aircraft.

In this regard, in embodiments in which the apparatus 300 is embodied by an aircraft system 204, the apparatus 300, such as the processor 302, the sensor circuitry 308, and/or the like, is configured to generate one or more sets of sensor data during an event (e.g., a takeoff or landing procedure) and cause transmission of the one or more sets of sensor data, for example, to a server 202 and via a network 206. In some embodiments, the set of sensor data received by server 202 from aircraft system 204 can comprise a plurality of sensor data and other data captured during the event at the aircraft system 204. For example, the set of sensor data can include measurement data, such as a plurality of measurements taken by the one or more sensors. These measurements may relate to one or more elevation levels of the aircraft, one or more speed levels of the aircraft, measurements related to detected cloud cover (e.g., measurements captured via one or more augmented reality processes of one or more sensors, such as a high-resolution camera and/or the like), distance values, external temperature measurements, and/or the like. In some embodiments, the set of sensor data can further comprise location data, such as, for example, one or more pairs of latitudinal and longitudinal coordinates, and/or the like. In embodiments, the set of sensor data can further comprise time data, such as one or more values representative of a time at which at least a portion of the set of sensor data was collected, and/or the like.

After having received the first set of sensor data, the server 202 can determine a cloud ceiling value. In this regard, at operation 402, the apparatus 300, such as the processor 302, the cloud ceiling circuitry 310, and/or the like, is configured to determine, based on the first set of sensor data, a cloud ceiling value for a location and a time at which the first set of sensor data was captured. For example, as described above, the cloud ceiling circuitry 310 can comprise one or more predefined functions and/or commands for determining a cloud ceiling value based on a set of received sensor data. In some embodiments, these predefined functions and/or commands may be associated with one or more photometric rendering processes and/or techniques.

The cloud ceiling value can be determined based at least on data included in the received set of sensor data. For example, based on a plurality of measurement data in the received set of sensor data, the server 202 can determine a cloud ceiling value representative of a height of the cloud ceiling at a particular location and at a particular time. For example, in some embodiments, based at least on the location data in the set of sensor data, the apparatus 300 can be configured to access a repository (e.g., repository 208) to determine a predefined landing region based on the location data in the received set of sensor data. In this regard, repository 208 can store a data structure, such as one or more tables and/or the like, comprising representations of a plurality of predefined landing regions (e.g., airports, stationed vessels, helipads, and/or the like) in association with a plurality of location coordinate values (e.g., latitudinal and longitudinal coordinates). In this regard, the server 202 can determine a cloud ceiling value for a particular location (e.g., a set of location coordinates included in the set of sensor data) and associate the determine cloud ceiling value with a particular landing region, for example, by matching the received location coordinates to location coordinates stored in association with a predefined landing region (e.g., in repository 208), or, in some embodiments, by determining a closest predefined landing region to the received location coordinates. At operation 403, the apparatus 300, such as the processor 302, the cloud ceiling circuitry 310, memory 304, and/or the like, is configured to store the cloud ceiling value in association with the landing region based on the location associated with the first set of sensor data. For example, the server 202 can store the determined cloud ceiling value in association with the predefined landing region in memory 304 and/or, in some embodiments, in repository 208.

At operation 404, the apparatus 300, such as the processor 302, the communication interface 306, and/or the like, is configured to cause transmission of the cloud ceiling value to one or more additional aircraft systems. In this regard, the server 202 can provide the determined cloud ceiling value for a particular landing region (e.g., an airport) to a plurality of additional aircraft.

As one example, an example determined cloud ceiling value represents a cloud ceiling value determined by sensor data captured at JFK International Airport during a takeoff operation of a first aircraft at 1:59 PM. The server 202 then causes transmission of the determined cloud ceiling value to at least one aircraft scheduled to land following the first aircraft at 2:05 PM. In some embodiments, transmission of the cloud ceiling value to one or more additional aircraft systems can occur automatically, such that the determined cloud ceiling value is broadcasted and made available to any aircraft system 204 (e.g., via input/output circuitry 312 of the aircraft system) that may need the cloud ceiling value. In this regard, the aircraft system can receive live, updated cloud ceiling information for one or more landing regions any time new cloud ceiling information is available. In some embodiments, transmission of the cloud ceiling value to one or more additional aircraft systems can occur upon receiving a request from an aircraft system 204 at the server 202 as further described below.

FIG. 5 illustrates operations that may be performed by the apparatus 300 (e.g., when embodied by server 202) for determining cloud ceiling information and providing the cloud ceiling information to a plurality of aircraft. At operation 501, the apparatus 300, such as the processor 302, the communication interface 306 or the like, is configured to receive one or more additional sets of sensor data associated with the first landing region from one or more additional aircraft systems. In this regard, as aircraft continuously perform takeoff and landing procedures at the first landing region (e.g., airport), the server 202 continuously receives additional sets of sensor data from aircraft during a respective event (e.g., ascension or descension).

At operation 502, the apparatus 300, such as the processor 302, the cloud ceiling circuitry 310, and/or the like, is configured to determine, based on the first set of sensor data and the one or more additional sets of sensor data, an updated cloud ceiling value for the first landing region. For instance, consider the example described above in which a cloud ceiling value was determined and stored based on a first set of sensor data captured at JFK International Airport during a takeoff operation of a first aircraft at 1:59 PM. The server 202 then causes transmission of the determined cloud ceiling value to an aircraft system 204 onboard a second aircraft scheduled to land following the first aircraft at 2:05 PM. During the landing operation of the second aircraft at 2:05 PM, the aircraft system of the second aircraft generates a second set of sensor data and causes transmission of the second set of sensor data to the server 202. The server 202 then determines an updated cloud ceiling value for the first landing region based at least on the second set of sensor data captured at JFK International Airport during the landing operation of a second aircraft at 2:05 PM. In this manner, the server 202 can store the updated cloud ceiling value in association with the first landing region (JFK International Airport), such that the cloud ceiling value stored in association with the landing region remains temporally accurate.

In some embodiments, determining the updated cloud ceiling value for the first landing region can further be based on flight resource data, stored in, for example, repository 208. For example, in some embodiments, the first landing region may comprise a lightly-trafficked airport or the like, such that the landing region has very few aircraft performing takeoff and landing procedures per day. In this regard, in an instance in which an aircraft approaching the first landing region, a most recent cloud ceiling value stored in association with the first landing region (e.g., the previous plane to take off or land from the first landing region) may have been stored several hours prior. As weather conditions, and thus cloud ceiling height, can change rapidly, the apparatus 202 can be configured to determine an updated cloud ceiling value for the first landing region based on one or more sets of sensor data as well as flight resource data.

In some embodiments, flight resource data can be stored for example, in memory 304 of the server 202 and/or repository 208. Flight resource data can be received from a plurality of locations in communication with the server 202 and/or repository 208, including, but not limited to, one or more aircraft systems 204, one or more third-party resources (e.g., a National Weather Service database, system, and/or the like), one or more organizations (e.g., weather reporting agencies), one or more ATC centers, and/or the like. For example, flight resource data can comprise a plurality of data including data such as weather forecasts (e.g., provided by the National Weather Service or similar agency), satellite imagery, pilot reports (PIREPs), Meteorological Aerodrome Reports (METAR), and/or local observations. In this regard, the apparatus 300 can utilize both previously determined cloud ceiling values and stored flight resource data to determine an accurate updated cloud ceiling value, particularly in situations in which a landing region may experience limited events (e.g., takeoff and landing operations).

At operation 503, the apparatus 300, such as the processor 302, the communication interface 306, and/or the like, is configured to cause transmission of the updated cloud ceiling value to one or more additional aircraft systems. Continuing with the above example, a third aircraft landing at 2:12 following the second aircraft can receive transmission of the updated cloud ceiling value based on the second set of sensor data captured at 2:05 rather than the cloud ceiling value based on the first set of sensor data captured at 1:59. In this regard, in some embodiments, aircraft can always receive a latest (e.g., most recent) cloud ceiling value associated with a respective landing region, such that the cloud ceiling information for the respective landing region is the most up-to-date. In this regard, in some embodiments, the apparatus 300, such as the processor 302, the cloud ceiling circuitry 310, and/or the like, is configured to aggregate the first set of sensor data and the one or more additional sets of sensor data to determine a most recent cloud ceiling value for a time period, wherein the updated cloud ceiling value represents the most recent cloud ceiling value.

In some embodiments, the apparatus 300, such as the processor 302, the cloud ceiling circuitry 310, and/or the like, is configured to aggregate the first set of sensor data and the one or more additional sets of sensor data to determine an average cloud ceiling value for a time period, wherein the updated cloud ceiling value represents the average cloud ceiling value. For example, in some embodiments, rather than associate a landing region with a most recent cloud ceiling value, in an instance in which an aircraft system 204 is malfunctioning and/or providing inaccurate sensor data leading to an inaccurate cloud ceiling value, the server 202 can aggregate a predefined number of determined cloud ceiling values (e.g., the previous ten cloud ceiling values stored in association with the landing region) to determine an average cloud ceiling value for the landing region and cause transmission of the average cloud ceiling value to one or more aircraft systems. In some embodiments, the server 202 can determine an average cloud ceiling value in an instance in which the most recent cloud ceiling value determined for a particular landing region comprises a value numerically higher or lower than a predefined value away from the previously determined cloud ceiling value. In some other embodiments, the apparatus 300, such as the processor 302, the cloud ceiling circuitry 310, and/or the like, is configured to aggregate the first set of sensor data and the one or more additional sets of sensor data to maintain a moving average cloud ceiling value.

In some embodiments, the apparatus 300, such as the processor 302, the communication interface 306, and/or the like, is configured to receive a cloud ceiling information request. In some embodiments, the server 202 can receive a cloud ceiling information request from an aircraft system 204. The cloud ceiling information request may be associated with a particular landing region. For example, an aircraft system 204 onboard an aircraft en route to a destination airport can cause transmission of a cloud ceiling information request for the destination airport, such that the request comprises an indication of the destination airport. In response to receiving the cloud ceiling information request, the server 202 can, in some embodiments, be configured to access the repository 208 and retrieve a cloud ceiling value associated with the destination airport and cause transmission of the retrieved cloud ceiling value to the aircraft system 204 that provided the request. As such, a pilot approaching a destination airport unequipped with an ILS due to a failure or other malfunction can receive up-to-date cloud ceiling information for the destination airport in near real-time to determine if a visual approach under VFR is attainable.

FIG. 6 illustrates operations that can be performed by the apparatus 300 (e.g., when embodied by server 202) for determining one or more alternative landing regions. At operation 601, the apparatus 300, such as the processor 302, the communication interface 306 or the like, is configured to receive a cloud ceiling information request associated with a first landing region from an aircraft system. As described above, an aircraft system 204 en route to a first landing region (e.g., a destination airport) can cause transmission of a cloud ceiling information request in order to receive cloud ceiling information associated with the destination airport from server 202.

In some embodiments, at operation 602, the apparatus 300, such as the processor 302, the cloud ceiling circuitry 310, and/or the like, is configured to determine whether the cloud ceiling value stored in association with the first landing region satisfies a predefined threshold. For example, based on the received cloud ceiling information request, the server 202 can access the repository 208 in order to retrieve a cloud ceiling value for the landing region identified in the cloud ceiling information request. The apparatus 300, in some embodiments, can further be configured to analyze the retrieved cloud ceiling value to determine whether the cloud ceiling value stored in association with the first landing region satisfies a predefined threshold. For example, a predefined threshold value associated with a preferred cloud ceiling value (e.g., a cloud ceiling height suitable for landing under a VFR approach) may be previously stored (e.g., in memory 304 and/or repository 208) and compared with the retrieved cloud ceiling value. For example, an example predefined threshold value may indicate a value of 1000, which represents that a minimum cloud ceiling height of 1000 feet is required for a VFR landing approach.

In this regard, in an instance in which the cloud ceiling value stored in association with the first landing region fails to satisfy the predefined threshold (e.g., the retrieved cloud ceiling value is less than the predefined threshold value), at operation 603, the apparatus 300, such as the processor 302, the cloud ceiling circuitry 310, and/or the like, is configured to determine, based at least on the first landing region, one or more alternative landing regions. In this regard, the server 202 can be configured to access the repository 208 in order to determine one or more predefined landing regions (e.g., based on location coordinates and/or the like) within a predefined distance to the first landing region. In some examples, the one or more alternative landing regions can be determined based on indications of one or more alternative landing regions stored in association with the particular destination airport. In this regard, alternative landing regions can be predefined for the particular destination landing region. In some embodiments, the repository can be regularly updated with data related to alternative landing regions to ensure that the predefined alternative landing regions for destination landing regions are accurate, e.g., in case of an alternative landing region closure and/or the like.

For example, in an instance in which the server 202 determines that the cloud ceiling at a destination airport for an aircraft is lower than 1000 feet and therefore not suitable for a visual landing under VFR, the server 202 can determine one or more alternative landing regions based at least on the location of the destination airport. As an example, an aircraft may not be able to land at its destination airport, JFK International Airport in Queens, N.Y., due to a low cloud ceiling. The server 202 can then determine one or more alternative landing regions based at least on the location of the destination airport. In this example, the one or more alternative landing regions can comprise Newark Liberty International Airport, LaGuardia Airport, and/or other airports within a predefined distance of JFK International Airport.

In some embodiments, the one or more alternative landing regions can be determined based on, in addition to the first landing region, a cloud ceiling value stored in association with the respective one or more alternative landing regions. In this regard, the determined alternative landing regions may only comprise landing regions having a suitable cloud ceiling value for landing using a VFR approach.

At operation 604, the apparatus 300, such as the processor 302, the communication interface 306 or the like, is configured to cause transmission of one or more cloud ceiling values associated with one or more alternative landing regions, for example, to the aircraft system 204 that initially caused transmission of the cloud ceiling information request. In some embodiments, the one or more cloud ceiling values associated with one or more alternative landing regions may be transmitted in addition to the cloud ceiling value associated with the first landing region. In this manner, a pilot can assess both the cloud ceiling value at the first landing region (e.g., the destination airport) and the cloud ceiling values for one or more alternative landing regions in order to determine the most suitable landing region at which to land the aircraft. For example, causing transmission of cloud ceiling values for each of the alternative landing regions equips the pilot to make a safe decision with regards to an appropriate landing region. While the alternative landing regions may each be associated with a cloud ceiling value suitable for a visual approach under VFR, an inexperienced pilot may not be comfortable performing a visual landing at an alternative landing region having a cloud ceiling of 1,300 feet and instead may decide to perform the landing at a second alternative landing region having a cloud ceiling of 2,300 feet.

As described above, a method, apparatus, and computer program product are disclosed for determining cloud ceiling information and providing the cloud ceiling information to a plurality of aircraft. By utilizing crowdsourced data received by sensors at a plurality of aircraft during takeoff and landing procedures to determine cloud ceiling information at a plurality of locations such as landing regions, cloud ceiling information for a plurality of landing regions can be kept up-to-date and available in near real-time to aircraft, such that a more efficient approach to determining and delivering cloud ceiling information is provided compared to conventional methods. Benefits of this design include increased situational awareness, safety, and efficiency for both aircraft and ground control, as well as reduced network transmissions, travel time, and fuel expenditure.

FIGS. 4-6 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 304 of an apparatus employing an embodiment of the present invention and executed by a processor 302. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus configured to determine and provide crowdsourced cloud ceiling data, the apparatus comprising at least one processor and at least one non-transitory memory including program code, the at least one non-transitory memory and the program code configured to, with the processor, cause the apparatus to at least:

receive a first set of sensor data from a first aircraft system, wherein the first set of sensor data comprises data captured by one or more sensors at the first aircraft system during a first event within a first landing region;

determine, based on the first set of sensor data, a cloud ceiling value for a location and a time at which the first set of sensor data was captured;

store the cloud ceiling value in association with the first landing region based on the location associated with the first set of sensor data;

in an instance in which the cloud ceiling value stored in association with the first landing region fails to satisfy a predefined threshold:

determine, based at least on the first landing region, one or more alternative landing regions;

receive a cloud ceiling information request from a second aircraft system; wherein the cloud ceiling information request is associated with the first landing region; and cause transmission of one or more indications of the one or more determined alternative landing regions, the cloud ceiling value associated with the first landing region and the one or more cloud ceiling values associated with one or more alternative landing regions to the second aircraft system, wherein the cloud ceiling value associated with the first landing region and the one or more cloud ceiling values associated with one or more alternative landing regions are caused to be transmitted in response to receiving the cloud ceiling information request.

2. The apparatus according to claim 1, wherein the memory including the program code is further configured to, with the processor, cause the apparatus to:

receive one or more additional sets of sensor data from one or more additional aircraft systems; wherein the one or more additional sets of sensor data are associated with the first landing region;

determine, based on the first set of sensor data and the one or more additional sets of sensor data, an updated cloud ceiling value for the first landing region; and cause transmission of the updated cloud ceiling value to one or more additional aircraft systems.

3. The apparatus according to claim 2, wherein the at least one non-transitory memory and the program code that is configured to, with the processor, cause the apparatus to at least determine an updated cloud ceiling value for the first landing region is further configured to:

aggregate the first set of sensor data and the one or more additional sets of sensor data to determine an average cloud ceiling value for a time period, wherein the updated cloud ceiling value represents the average cloud ceiling value.

4. The apparatus according to claim 2, wherein the at least one non-transitory memory and the program code that is configured to, with the processor, cause the apparatus to at least determine an updated cloud ceiling value for the first landing region is further configured to:

aggregate the first set of sensor data and the one or more additional sets of sensor data to determine a most recent cloud ceiling value for a time period, wherein the updated cloud ceiling value represents the most recent cloud ceiling value.

5. The apparatus according to claim 1, wherein the first event comprises an ascension of the aircraft system within the first landing region or a descension of the first aircraft system within the first landing region.

6. The apparatus according to claim 1, wherein the determination of the one or more alternative landing regions is further based on one or more cloud ceiling values associated with the one or more alternative landing regions, and at least one non-transitory memory and the program code that is configured to, with the processor, cause the apparatus to cause transmission of the one or more cloud ceiling values associated with one or more alternative landing regions is further configured to:
   determine whether the one or more cloud ceiling values stored in association with the one or more alternative landing regions satisfy the predefined threshold,
   wherein the transmission of the one or more cloud ceiling values associated with one or more alternative landing regions includes only cloud ceiling values associated with one or more alternative landing regions that satisfy the predefined threshold.

7. A computer-implemented method configured to determine and provide crowdsourced cloud ceiling data, the method comprising:
   receiving a first set of sensor data from a first aircraft system, wherein the first set of sensor data comprises data captured by one or more sensors at the first aircraft system during a first event within a first landing region;
   determining, based on the first set of sensor data, a cloud ceiling value for a location and a time at which the first set of sensor data was captured;
   storing the cloud ceiling value in association with the first landing region based on the location associated with the first set of sensor data;
   in an instance in which the cloud ceiling value stored in association with the first landing region fails to satisfy a predefined threshold:
      determining, based at least on the first landing region, one or more alternative landing regions;
      receiving a cloud ceiling information request from a second aircraft system; wherein the cloud ceiling information request is associated with the first landing region; and
      causing transmission of one or more indications of the one or more determined alternative landing regions, the cloud ceiling value associated with the first landing region and the one or more cloud ceiling values associated with one or more alternative landing regions to the second aircraft system, wherein the cloud ceiling value associated with the first landing region and the one or more cloud ceiling values associated with one or more alternative landing regions are caused to be transmitted in response to receiving the cloud ceiling information request.

8. The computer-implemented method according to claim 7, further comprising:
   receiving one or more additional sets of sensor data from one or more additional aircraft systems; wherein the one or more additional sets of sensor data are associated with the first landing region;
   determining, based on the first set of sensor data and the one or more additional sets of sensor data, an updated cloud ceiling value for the first landing region; and
   causing transmission of the updated cloud ceiling value to one or more additional aircraft systems.

9. The computer-implemented method according to claim 8, wherein determining an updated cloud ceiling value for the first landing region comprises:
   aggregating the first set of sensor data and the one or more additional sets of sensor data to determine an average cloud ceiling value for a time period, wherein the updated cloud ceiling value represents the average cloud ceiling value.

10. The computer-implemented method according to claim 8, wherein determining an updated cloud ceiling value for the first landing region comprises:
   aggregating the first set of sensor data and the one or more additional sets of sensor data to determine a most recent cloud ceiling value for a time period, wherein the updated cloud ceiling value represents the most recent cloud ceiling value.

11. The computer-implemented method according to claim 7, wherein the first event comprises an ascension of the aircraft system within the first landing region or a descension of the first aircraft system within the first landing region.

12. The computer-implemented method according to 8, wherein the determination of the one or more alternative landing regions is further based on one or more cloud ceiling values associated with the one or more alternative landing regions, and causing transmission of the one or more cloud ceiling values associated with one or more alternative landing regions comprises:
   determining whether the one or more cloud ceiling values stored in association with the one or more alternative landing regions satisfy the predefined threshold,
   wherein the transmission of the one or more cloud ceiling values associated with one or more alternative landing regions includes only cloud ceiling values associated with one or more alternative landing regions that satisfy the predefined threshold.

13. A computer program product comprising at least one non-transitory computer-readable storage medium having computer-readable program code portions stored therein, the computer-readable program code portions comprising an executable portion configured to:
   receive a first set of sensor data from a first aircraft system, wherein the first set of sensor data comprises data captured by one or more sensors at the first aircraft system during a first event within a first landing region;
   determine, based on the first set of sensor data, a cloud ceiling value for a location and a time at which the first set of sensor data was captured;
   store the cloud ceiling value in association with the first landing region based on the location associated with the first set of sensor data;
   in an instance in which the cloud ceiling value stored in association with the first landing region fails to satisfy a predefined threshold:
      determine, based at least on the first landing region, one or more alternative landing regions;
      receive a cloud ceiling information request from a second aircraft system; wherein the cloud ceiling information request is associated with the first landing region; and
      cause transmission of one or more indications of the one or more determined alternative landing regions, the cloud ceiling value associated with the first landing region and the one or more cloud ceiling values associated with one or more alternative landing regions to the second aircraft system, wherein the cloud ceiling value associated with the first landing region and the one or more cloud ceiling values associated with one or more alternative landing regions are caused to be transmitted in response to receiving the cloud ceiling information request.

14. The computer program product according to claim 13, wherein the computer-readable program code portions comprising the executable portion are configured to further:

receive one or more additional sets of sensor data from one or more additional aircraft systems; wherein the one or more additional sets of sensor data are associated with the first landing region;

determine, based on the first set of sensor data and the one or more additional sets of sensor data, an updated cloud ceiling value for the first landing region; and cause transmission of the updated cloud ceiling value to one or more additional aircraft systems.

15. The computer program product according to claim 14, wherein the computer-readable program code portions comprising an executable portion configured to determine an updated cloud ceiling value for the first landing region are further configured to:

aggregate the first set of sensor data and the one or more additional sets of sensor data to determine an average cloud ceiling value for a time period, wherein the updated cloud ceiling value represents the average cloud ceiling value.

16. The computer program product according to claim 14, wherein the computer-readable program code portions comprising an executable portion configured to determine an updated cloud ceiling value for the first landing region are further configured to:

aggregate the first set of sensor data and the one or more additional sets of sensor data to determine a most recent cloud ceiling value for a time period, wherein the updated cloud ceiling value represents the most recent cloud ceiling value.

17. The computer program product according to claim 13, wherein the first event comprises an ascension of the aircraft system within the first landing region or a descension of the first aircraft system within the first landing region.

18. The computer program product according to 15, wherein the determination of the one or more alternative landing regions is further based on one or more cloud ceiling values associated with the one or more alternative landing regions, and the computer-readable program code portions comprising an executable portion configured to cause transmission of the one or more cloud ceiling values associated with one or more alternative landing regions are further configured to:

determine whether the one or more cloud ceiling values stored in association with the one or more alternative landing regions satisfy the predefined threshold, wherein the transmission of the one or more cloud ceiling values associated with one or more alternative landing regions includes only cloud ceiling values associated with one or more alternative landing regions that satisfy the predefined threshold.

\* \* \* \* \*